J. WALKER.
PACKING.
APPLICATION FILED OCT. 24, 1910.

1,035,279.

Patented Aug. 13, 1912.

Witnesses—
Stanley Wood
H. W. Beake

Inventor
James Walker
by
W. E. Evans
Attorney.

ns to be Letters Patent.# UNITED STATES PATENT OFFICE.

JAMES WALKER, OF POPLAR, LONDON, ENGLAND, ASSIGNOR TO JAMES WALKER AND COMPANY LIMITED, OF LONDON, ENGLAND.

PACKING.

1,035,279.  Specification of Letters Patent.  Patented Aug. 13, 1912.

Application filed October 24, 1910. Serial No. 588,894.

*To all whom it may concern:*

Be it known that I, JAMES WALKER, a subject of the King of Great Britain and Ireland, residing at Lion Works, Garford street, Poplar, London, E., England, have invented certain new and useful Improvements Relating to Packing, of which the following is a specification.

This invention relates more especially to piston or gland packing for use with steam, water, air or other fluid, of the kind in which a recess is provided at the upper surface of the packing to form a lip at the side of the packing and to serve as a pressure space by which pressure may be exercised upon the lip to press it closely into contact with the surface against which the packing is applied and thus to secure a fluid tight joint.

The invention has for its object to provide convenient means to prevent the deformation of the packing when it is compressed in use, so as to avoid the closing up of the pressure space referred to and at the same time to permit the provision of a second lip which will serve to insure a fluid tight joint at the other side of the packing.

According to the invention at each side of the packing there is formed a lip by which fluid tight joints are secured and centrally disposed between the lips there is provided a projecting rib or ridge of a hard nature which is adapted to make contact with the turn of packing next to it and thus to prevent the closing up of the pressure spaces formed between the rib or ridge and the lips.

According to the invention the rib or ridge may be formed integrally with the body of the packing or it may form the central portion of the packings and extend partly or wholly through the thickness thereof, the body of the packing being formed as two portions, each having a lip, adapted to be applied on opposite faces of the central portion and secured in position thereon by means of metallic pins which may serve to form a metallic wearing face, if desired. Other means of securing separate parts of the packing together may be employed, and metal may be introduced to form a metallic wearing surface in any suitable manner.

The rib or ridge may be provided to project both from the upper and lower surfaces of the packing.

The invention is illustrated, by way of example, in the accompanying drawings, in which—

Figure 1:
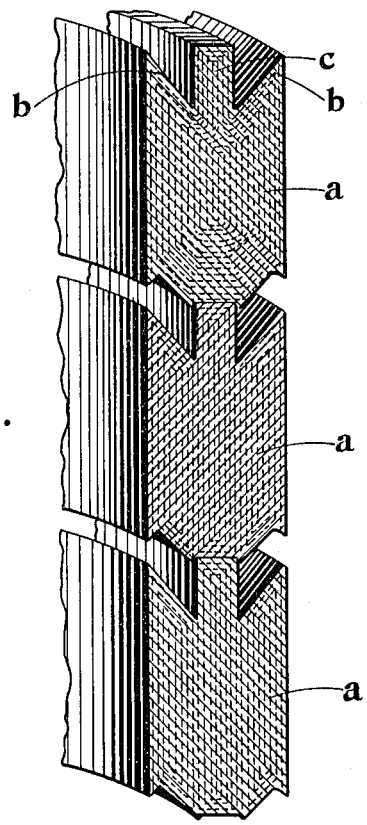
Figure 2:
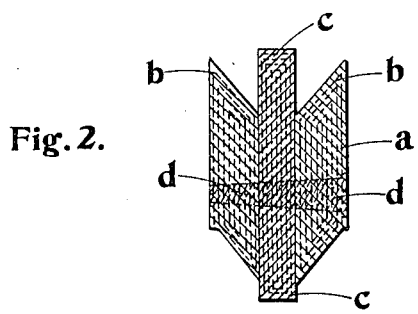

Figure 1 represents a form of the packing in which the rib or ridge projects only from one face and is formed integrally with the body of the packing. Fig. 2 represents a form of the packing in which the rib or ridge is formed separate from the body parts of the packing and projects from the upper and lower surfaces of the packing.

In carrying the invention into effect in the manufacture of packing *a* as shown in Fig. 1, layers of cloth are rolled up in endless folds and solutioned together by means of rubber, the lips *b* and the rib or ridge *c* being formed during the operation, or the portion by which the ridge is formed may be prepared separately and may be brought to the necessary degree of hardness required by any suitable means and the body part of the packing be then formed about it, the whole being solutioned together.

In the modification illustrated in Fig. 2 the ridge or rib-forming portion which is provided of a rectangular cross-section of such depth as to provide a rib or ridge *c* projecting from both faces of the packing, is prepared and hardened separately from the portions of the body of the packing upon which the lips *b* are formed, which portions when completed are assembled at the respective sides of the rib portion and secured thereto in any suitable manner. The pins *d* which may be provided to form a metallic wearing surface may serve as a means of securing the parts of the packing together.

It will be understood that any suitable materials may be used in the production of the packing, thus a composition may be used in place of a cloth. It will also be understood that the invention is not limited to any particular cross-sectional shape of the packing.

What I claim as my invention and desire to secure by Letters Patent is:—

1. A packing for pistons and glands provided with a centrally disposed ridge of hard material and two lips of soft material disposed one on each side of the ridge and adapted to be acted upon by the fluid pressure to give fluid-tight joints at each side of the packing, substantially as described.

2. A packing for pistons and glands comprising a hard central portion, two softer portions, one of the softer portions being disposed on each side of the hard central portion, lips on said softer portions, said lips being adapted to be acted upon by the fluid pressure to give fluid tight joints at each side of the packing.

3. Packing for pistons comprising a number of superimposed layers each composed of a central member, flank portions disposed one on each side of said central member, lips provided on the flank portions, said lips being adapted for the purpose of being acted upon by the fluid pressure to give fluid tight joints on each side of the packing.

4. Packing for pistons comprising a number of superimposed layers each composed of a central member, said central member being of a hard nature so as to form a means of support between the separate layers, flank portions disposed one on each side of said central member, said flank members being of a softer nature than the said central member, lips provided on the flank portions, said lips being adapted for the purpose of being acted upon by the fluid pressure to give fluid tight joints on each side of the packing.

5. Packing for pistons comprising a number of superimposed layers each composed of a central member, flank portions disposed one on each side of said central member, lips provided on the flank portions, said lips being adapted for the purpose of being acted upon by the fluid pressure to give fluid tight joints on each side of the packing, said hard central portion projecting beyond the softer portions to prevent the closing of the lips.

In testimony whereof I have hereunto signed my name to this specification in the presence of two subscribing witnesses.

JAMES WALKER.

Witnesses:
   FREDERICK E. SQUIRE,
   RIPLEY WILSON.